United States Patent

Hamann

[15] 3,645,188
[45] Feb. 29, 1972

[54] PROJECTING APPARATUS AND DISPLAY SYSTEM USING SAME

[72] Inventor: Omer F. Hamann, La Jolla, Calif.
[73] Assignee: Stromberg Datagraphix, Inc., San Diego, Calif.
[22] Filed: May 18, 1970
[21] Appl. No.: 38,403

[52] U.S. Cl. ................................95/11, 95/4.5, 350/160 P
[51] Int. Cl. ..........................................................G03b 19/00
[58] Field of Search................95/11, 4.5; 346/110, 17 A; 350/160 P

[56] References Cited

UNITED STATES PATENTS

| | | | |
|---|---|---|---|
| 3,377,424 | 4/1968 | Glenn, Jr. et al. | 346/17 A |
| 3,273,477 | 9/1966 | De Hart | 95/11 |
| 3,259,040 | 7/1966 | Kumazai | 95/11 |
| 3,225,138 | 12/1965 | Montani | 350/160 P UX |
| 3,155,451 | 11/1964 | Dunster et al. | 350/160 P UX |
| 3,207,051 | 9/1965 | Cooper et al. | 95/4.5 |
| 3,258,525 | 6/1966 | Piatt et al. | 346/110 X |
| 3,359,563 | 12/1967 | Stetten | 346/110 X |
| 3,454,414 | 7/1969 | Andes et al. | 350/160 P X |

*Primary Examiner*—Samuel S. Matthews
*Assistant Examiner*—Richard M. Sheer
*Attorney*—John R. Duncan

[57] ABSTRACT

Apparatus is described for projecting successive images onto a light-sensitive surface. The apparatus includes an evacuated enclosure and at least two movable electron-sensitive image storage areas therein. The areas are movable in a manner which permits storing on one area while, at the same time, the image stored on the other area is being projected onto the recording surface.

4 Claims, 2 Drawing Figures

PATENTED FEB 29 1972          3,645,188

INVENTOR.
OMER F. HAMANN
BY John R. Bluman
ATTORNEY

PROJECTING APPARATUS AND DISPLAY SYSTEM USING SAME

This invention relates to recording apparatus and, more particularly, to improved apparatus for projecting successive images onto a light-sensitive recording surface, and to an improved display system utilizing such apparatus. The apparatus and system of the present invention are particularly useful in recording the output of various types of computers in which information is stored.

Information retrieval systems employ various types of apparatus and systems for imaging the retrieved information, either temporarily or permanently, on some type of display surface. The display surface may be the screen of a cathode-ray tube or the screen of a film projection system, or may be pages of paper or similar material upon which the information is printed. Where information is retrieved from an electronic store, a visible image is derived by application of the stored electrical signals to the deflection elements of a cathode-ray writing system to produce the information in the form of alphanumeric characters, mathematical curves, or other convenient visible symbols. Various types of cathode-ray systems for accomplishing this are well known in the art.

Frequently, it is desirable to record information on films in which the information is of reduced size, such as in microfilm systems. Subsequent projection of the image recorded on the film and enlargement thereof affords a visual display of the retrieved information. Many films are available which are of sufficient sensitivity and resolution as to permit recordation by direct exposure to a typical electron-sensitive phosphor screen. Such films, however, usually have the disadvantage of requiring liquid chemicals for their development. Because of this, elaborate apparatus and long development time are often required, and therefore such films may be inconvenient for use in systems in which a short development time and simple development apparatus are desirable.

Certain types of films have been developed that require no additional chemicals or special powders for image development. One such type of film, sold under the name "Kalvar" and comprising a layer of thermoplastic resin having an ultraviolet-sensitive material dispersed therein, is sensitive in the light spectrum from about 340° to 430 millimicrons wavelength in the ultraviolet spectrum. Other such types of films utilize photochromic materials or dyes which have the property of being transparent under normal conditions, but become temporarily opaque in certain regions of the visible light spectrum when stimulated with electrons or ultraviolet light. The persistence of photochromic dyes remaining in the opaque state is primarily a function of their temperature and, therefore, images produced with such dyes may be erased quickly by raising their temperature appropriately. Nevertheless, some time is required for this process. Moreover, exposure of both "Kalvar" and photochromic films to the image requires a relatively long length of time or a very high level of intensity of the ultraviolet light. Although systems using optical fibers have been employed to transmit images of visible light at high efficiency, where increased intensity is desirable, such are not typically of advantage in exposing microimages on the types of films under consideration because the resolution is limited to the size of the fibers and because the fibers typically have low transmissivity and high losses with ultraviolet light.

Thus, in construction apparatus for projecting successive images onto a light-responsive surface, numerous design problems may arise where the light-responsive surface is subject to the limitations connected with "Kalvar" film or films utilizing photochromic dyes. Such apparatus should achieve adequate image intensity in the ultraviolet spectrum, and should be capable of generating successive images at a rapid operating rate even though the exposure of such a film to each image takes a substantial length of time.

Accordingly, it is an object of the present invention to provide improved apparatus for projecting successive images onto a light-responsive surface.

Another object of the invention is to provide an improved system in which such apparatus is employed.

A further object of the invention is to provide apparatus for facilitating the recording of visual images of electronically stores information on film of a type that requires no additional chemicals or special powders for image development.

It is another object of the invention to provide apparatus of the foregoing type which is operable at a convenient rate of speed.

Other objects of the invention will become apparent to those skilled in the art from the following description, taken in connection with the accompanying drawings wherein.

Very generally, the apparatus of the invention comprises an evacuated enclosure 11, in which at least two movable image storage areas 12 and 13 are disposed. Each area is sensitive to impingement of electrons thereon to produce an image in accordance with the pattern of electron impingement thereon. Means 14 are also disposed within the evacuated enclosure for directing electrons to impinge on a first one of the image storage areas in accordance with a predetermined pattern. A projection system 16 is employed for projecting the image stored on a second one of the image storage areas onto a light sensitive surface 31. The first image storage area is movable from such position to enable projection of the image stored on the first image storage area.

Figure 1:
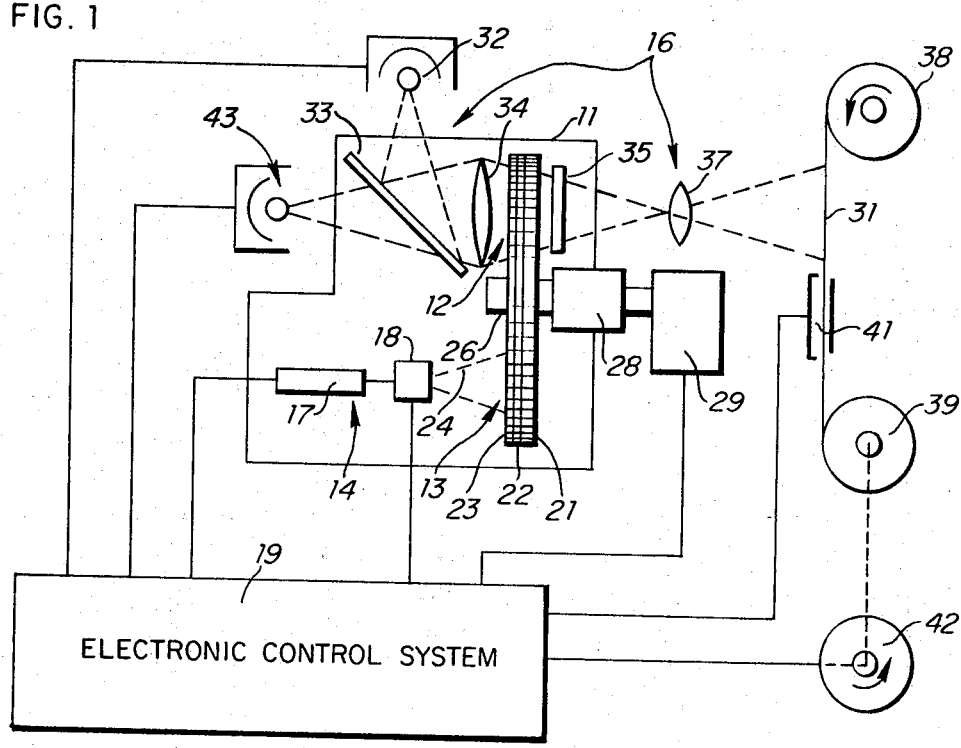
FIG. 1 is a diagrammatical view of the system of the invention employing apparatus constructed in accordance with the invention.

Referring now more particularly to FIG. 1, the evacuated enclosure 11 may be any convenient structure of metal, glass or other suitable material. The illustrated shape is not critical to the invention, although the enclosure is shaped to include both image storage areas 12 and 13. In this way no image storage material need be moved into or out of the vacuum system during operation of the apparatus. Moreover it is necessary that the evacuated enclosure 11 enclose the electron-directing means 14 for proper operation thereof.

The electron-directing means 14 include an electron gun 17 and a deflection system 18. These items are shown schematically and may be of a variety of types. Thus, the electron-directing means 14 may operate to move the electron beam in a manner to write lines of alphanumeric characters or other symbols, or to produce the lines of an image raster pattern. Alternatively, the beam may be deflected to a selected one of a plurality of shaped apertures in an opaque plate. The resulting cross section of the beam defines a desired alphanumeric character or other symbol and such character or symbol is produced upon impingement of the beam on a target. The specific nature of the directing means 14 is therefore not critical to the invention.

An electronic control system 19 is provided connected to both the electron gun 17 and the deflection system 18 to provide appropriate intensity and deflection signals in accordance with the information to be reproduced. The control system 19 operates in accordance with electronic information derived from an electronic information storage system, computer, or other source of information.

The image storage areas 12 and 13 are on a disc 21 of a suitable transparent material, such as glass. The disc 21 has a thin coating 22 of reversible (i.e., erasable) photochromic material or dyes. Also a thin (e.g., 1 mil) layer 23 of phosphor is deposited over the photochromic layer 22. The phosphor layer 23 is not necessary if the photochromic layer 22 is sensitive to the impingement of electrons thereon. Many photochromic materials, however, are not sensitive to impingement of electrons thereon and hence the layer of transparent phosphor 23 is deposited thereon to serve as an energy transducer. The phosphor 23 becomes energized upon impingement of electrons to produce the necessary ultraviolet light output for causing the desired changes in the photochromic dyes of the layer 22. The size of the area 13 upon which the image produced by the electron-directing means 14 is formed is dependent upon the deflection characteristics and magnitude of the deflection system 18, and the extremes of the image-defining beam pattern are indicated by the dotted lines 24.

The disc 21 is mounted on a rotary axle 26 supported in a rotary motion feed through bearing 28 supported in the wall of the evacuated enclosure 11. The rotary motion feed through bearing 28 may be of any suitable design and construction, which permits rotation of the axle 26 while maintaining a vacuumtight seal between the axle and the wall of the enclosure 11. A satisfactory device for this purpose is Type No. 1324 available from National Research Corp. The outer end of the axle 26 is driven by a stepping motor 29 which is capable of being energized by the electronic control system to rotate the disc 21 through a series of discrete positions.

An image stored on the area 12 is projected on a light-sensitive recording surface 31 by means of the projection system 16. The projection system 16 includes a flashlamp 32 mounted exteriorly of the evacuated enclosure 11 and controlled by the electronic control system 19. The flashlamp 32 produces a light output of high ultraviolet content which is passed through a suitable window, not shown, in the wall of the evacuated enclosure 11. A dichroic mirror 33, capable of reflecting ultraviolet light, is disposed in the path of the light from the lamp 32 at an angle to reflect the light through the image storage area 12. A suitable convergence lens 34 is positioned between the mirror 33 and the arc 12 to effect optimum utilization of the light. After passing through the area 12, the light then passes through a filter 35 which is designed to pass optical energy below about 430 millimicrons to restrict the light energy to the range of sensitivity of "Kalvar" film. The light is passed through a focusing lens 37 to sharply image on the light-sensitive surface 31. A suitable window, not shown, is provided in the wall of the evacuated enclosure 11 to allow the light to pass therethrough.

In the recording system illustrated in FIG. 1, the light-responsive surface 31 comprises a portion of a strip of "Kalvar" film which is moved between two reels 38 and 39. Successive images are recorded on the film in a latent condition and are subsequently developed, as is known in the art, by passing them through a heat developing station 41. Thus, a series of microfilm images may be recorded on a strip of "Kalvar" film as it is passed from the reel 38 to the reel 39. Operation of the takeup reel 39 is controlled through a drive motor 42 by the electronic control system 19.

After flash projection of the image on the area 12, the image is erased by means of a lamp 43 which produces a light output of high infrared content. The lamp 43 is controlled by the electronic control system 19 and passes its light through a suitable window, not shown, in the wall of the evacuated enclosure 11. As is known in the art, although the dichroic mirror 33 will reflect light of high ultraviolet content, it will pass light of high infrared content. Accordingly, the infrared light is passed through the dichroic mirror 33 to be concentrated by the lens 34 onto the area 12. This erases the images on the area 12, thereby preparing it for storage of a new image thereon. The filter 35 protects the surface 31 from the infrared light.

In operation, the stepping motor rotates to exchange the position of the areas 12 and 13. Although two image storage areas are referred to, the device is operable with not only two areas (with a step in the amount of 180° rotation), but with more than two areas, depending upon the size of the disc in relation to the size of the individual areas. Moreover, the image storage areas need not be contiguous, nor need they be on the same substrate. In the illustrated embodiment, exposure of one area can proceed simultaneously with projection and erasure of the other. Obviously, if three or more image storage areas are provided, the apparatus may be arranged so that exposure, projection and erasure can proceed simultaneously without need for the spectral filter 35 and the dichroic mirror 33. In either case, exposure, erasure and projection can proceed simultaneously, which is a distinct advantage when photochromic materials are utilized, since erasure thereof and sometimes exposure can be a slow process. No optical fibers are utilized to transmit the image, thereby avoiding the difficulties cased by resolution limitations and ultraviolet losses inherent in optical fiber systems.

The phosphor employed in the layer 23 may be of any suitable type. A type which emits light in the region of 360 to 400 millimicrons wavelength is preferred. A P-16 phosphor emits in this region. The erase lamp 43 is preferably of a type which provides energy in the region from about 400 millimicrons and higher in order to obtain photobleaching as well as heat bleaching. Incandescent lamps emit in this region. Absorption characteristic data for the various types of photochromic material and "Kalvar" films are available from manufacturers.

Figure 2:
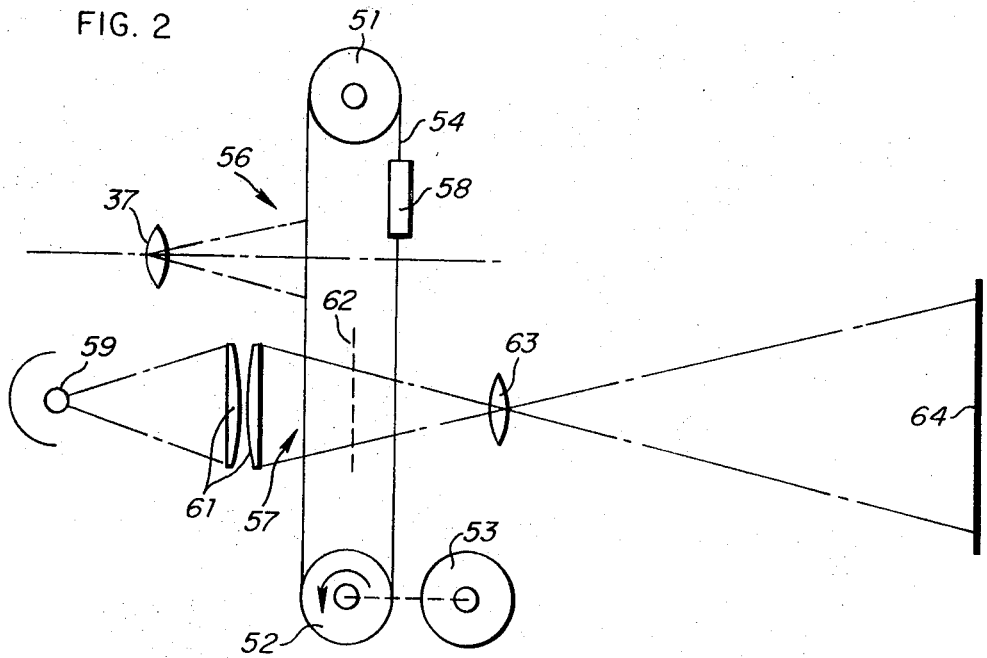
FIG. 2 is a diagrammatical view of a portion of an alternative embodiment of the system of the invention.

Referring now to FIG. 2, a modification of the display system of the invention is shown that provides a visual display rather than simply recording information on film. A portion of a display system is shown in FIG. 2 in which only the lens 37 of the projecting apparatus of the invention is illustrated. The display system includes a pair of rollers 51 and 52, the latter being driven by a stepping motor 53. The rollers 51 and 52 drive an endless belt 54 of photochromic film through an exposure station 56, a projection station 57 and an erase station 58. The erase station comprises a heater which erases images from the film after projection at the projection station. The photochromic film 54 is exposed at the exposure station 56 to produce a visual image thereon. A projection system is provided including a projection lamp 59, a pair of condensing lenses 61, and a projection lens 63. A suitable mirror, not shown, folds the projection optics at the plane 62 and projects the image through the projection lens 63 onto a display screen 64 upon which the information may be viewed. The motor 53 steps the film belt around so that subsequent images are displayed on the display screen 64.

It may therefore be seen that the invention provides improved apparatus for projecting successive images onto a light-responsive surface. The invention also provides an improved system utilizing such apparatus. The apparatus may be utilized for recording information on films of the type that require no additional chemicals or special powders for image development. Rapid production of successive images is accomplished notwithstanding the fact that exposure of such films requires substantial amounts of light energy at ultraviolet wavelengths.

Various modifications of the invention in addition to those shown and described herein will become apparent to those skilled in the art from the foregoing description and accompanying drawings. Such modifications are intended to fall within the scope of the appendant claims.

What is claimed is:

1. Apparatus for projecting successive images onto an ultraviolet-light-sensitive sheet surface, comprising, an evacuated enclosure, a movable member within said enclosure having at least two spaced image storage areas each comprising a transparent photochromic material sensitive to impingement of electrons thereon to produce an opaque-and-transparent image in accordance with the pattern of electron impingement thereon, means within said enclosure for directing electrons to impinge on a first one of said image storage areas in accordance with a predetermined pattern, a projection system for directing light of high ultraviolet content through the image stored on a second one of said image storage areas onto a light-sensitive surface, means for moving said member to move said first image storage area to the position of said second image storage area and to move said second image storage area from such position to enable projection of the image stored on said first image storage area and infrared radiation means to erase said image after projection.

2. Apparatus according to claim 1 wherein said member is a rotary disc, and wherein said moving means are operable to rotate said disc to move said image storage areas between said positions.

3. Apparatus according to claim 1, wherein said projection system includes a first light source to produce light of a high ultraviolet content and a dichroic mirror for reflecting light from said first light source through said image to project the image, and wherein said erasing means comprise a second light source to produce light of high infrared content located to pass light through said dichroic mirror to said image for erasing the image.

4. Apparatus according to claim 1, wherein said projection system includes a light source of high ultraviolet content, and said film comprises ultraviolet-sensitive heat-developable vesicular film.